United States Patent
Sawal et al.

(10) Patent No.: US 10,608,879 B2
(45) Date of Patent: Mar. 31, 2020

(54) VALIDATION USING NATURAL LANGUAGE PROCESSING

(71) Applicant: DELL PRODUCTS L.P., Round Rock, TX (US)

(72) Inventors: Vinay Sawal, Fremont, CA (US); Sachinrao Chittaranjan Panemangalore, San Jose, CA (US); Vivek Dharmadhikari, San Jose, CA (US); Kuntal Atulbhai Patel, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 925 days.

(21) Appl. No.: 15/098,107

(22) Filed: Apr. 13, 2016

(65) Prior Publication Data

US 2017/0111225 A1 Apr. 20, 2017

Related U.S. Application Data

(63) Continuation-in-part of application No. 15/045,116, filed on Feb. 16, 2016, which is a continuation-in-part of application No. 14/885,015, filed on Oct. 16, 2015.

(51) Int. Cl.
- *H04L 12/24* (2006.01)
- *G06F 16/35* (2019.01)
- *G06Q 10/00* (2012.01)

(52) U.S. Cl.
CPC .......... *H04L 41/0869* (2013.01); *G06F 16/35* (2019.01); *G06Q 10/00* (2013.01); *H04L 41/0843* (2013.01); *H04L 41/0886* (2013.01)

(58) Field of Classification Search
CPC ............. H04L 41/0853; H04L 41/0886; H04L 41/0869
See application file for complete search history.

(56) References Cited

U.S. PATENT DOCUMENTS

| | | | |
|---|---|---|---|
| 6,065,003 A | 5/2000 | Sedluk | |
| 6,070,133 A | 5/2000 | Brewster et al. | |

(Continued)

OTHER PUBLICATIONS

Nanduri, Sastry, and Spencer Rugaber. "Requirements validation via automated natural language parsing." Journal of Management Information Systems 12, No. 3 (1995): 9-19. (Year: 1995).*

(Continued)

*Primary Examiner* — Jesse P Frumkin
(74) *Attorney, Agent, or Firm* — North Weber & Baugh LLP

(57) ABSTRACT

Aspects of the present disclosure relate to systems and methods that help automate the validation of a configuration of a functional product. Every functional product, be it a service, device, or combination thereof, has one or more documents associated with it. These documents may include such documentation as: (1) Release Notes; (2) Configuration Guides; (3) command line interfaces (CLIs)/application program interfaces (APIs); (4) Data Sheets; (5) Installation Guides; (6) User Manuals; (7) Errata notices; and (8) other documentation. In embodiments, datatset used for validating a configuration setting may be extracted using natural language processing from technical documentation. In embodiments, this extracted information is used to validate a design vector representing a configuration setting.

20 Claims, 14 Drawing Sheets

(56) References Cited

U.S. PATENT DOCUMENTS

| | | | |
|---|---|---|---|
| 6,275,976 | B1 | 8/2001 | Scandura |
| 9,043,759 | B1 | 5/2015 | Lininger |
| 9,722,879 | B1 | 8/2015 | Muthu |
| 9,792,275 | B2* | 10/2017 | Panemangalore .. G06F 17/2264 |
| 9,805,717 | B2 | 10/2017 | Panemangalore |
| 2004/0117380 | A1 | 6/2004 | Perrow |
| 2004/0205560 | A1 | 10/2004 | Polk |
| 2006/0195747 | A1 | 8/2006 | Pramanick |
| 2007/0061348 | A1 | 3/2007 | Holland |
| 2008/0140537 | A1 | 6/2008 | Powell |
| 2009/0094231 | A1 | 4/2009 | Marvit |
| 2009/0288072 | A1* | 11/2009 | Kania .............. G06F 11/368 717/131 |
| 2009/0319388 | A1 | 12/2009 | Yuang et al. |
| 2010/0010989 | A1 | 1/2010 | Li |
| 2010/0082333 | A1 | 4/2010 | Al-Shammari |
| 2011/0022560 | A1 | 1/2011 | Breiter |
| 2011/0145316 | A1 | 6/2011 | Ait-Ameur |
| 2012/0016909 | A1* | 1/2012 | Narain ............... H04L 41/0869 707/794 |
| 2012/0089394 | A1 | 4/2012 | Teodosiu |
| 2013/0055029 | A1 | 2/2013 | Lawrance |
| 2013/0238629 | A1* | 9/2013 | Kosuri .............. H04L 41/0856 707/741 |
| 2013/0268260 | A1 | 10/2013 | Lundberg |
| 2013/0268916 | A1 | 10/2013 | Misra |
| 2013/0268917 | A1 | 10/2013 | Chandrasekharan |
| 2014/0106734 | A1 | 4/2014 | Lee |
| 2014/0136187 | A1 | 5/2014 | Wolverton |
| 2014/0214904 | A1 | 7/2014 | Ims |
| 2014/0223417 | A1 | 8/2014 | Schnitzhofer |
| 2014/0282178 | A1 | 9/2014 | Borzello |
| 2015/0052147 | A1* | 2/2015 | Halabi ............. H04L 41/0853 707/741 |
| 2015/0254337 | A1* | 9/2015 | Iikura ............... G06F 16/353 707/740 |
| 2015/0348554 | A1 | 12/2015 | Orr |
| 2016/0026631 | A1* | 1/2016 | Salam .................... H04L 41/16 707/694 |
| 2016/0042299 | A1 | 2/2016 | Liang et al. |
| 2016/0140123 | A1 | 5/2016 | Chang |
| 2016/0225371 | A1 | 8/2016 | Agrawal |
| 2017/0109356 | A1* | 4/2017 | Sawal ............... G06F 16/3322 |
| 2017/0109697 | A1* | 4/2017 | Panemangalore .... G06F 16/245 |
| 2017/0109698 | A1* | 4/2017 | Panemangalore ..... G06Q 10/10 |
| 2018/0267887 | A1* | 9/2018 | Dsouza ............... G06F 11/3684 |

OTHER PUBLICATIONS

Response filed Sep. 26, 2018, in related U.S. Appl. No. 15/045,116 (14 pgs).
Response filed Oct. 19, 2018, in related U.S. Appl. No. 15/268,488 (13 pgs).
Non-Final Office Action dated Dec. 26, 2017, in related U.S. Appl. No. 15/045,116 (26 pgs).
Response filed Feb. 28, 2018, in related U.S. Appl. No. 15/045,116 (13 pgs).
Arista at-a-glance, "CloudVisionTM: Single Point of Administration and Management," [online], [retrived Mar. 1, 2015]. Retrieved from Internet <URL: https://www.arista.com> (3 pgs).
Arista at-a-glance, "EOS Cloudvision," [online]. Retrieved from Internet <URL: https://www.arista.com>, 2015 (2 pgs).
Patseer, "Voice Recognition—Controlling mobile devices using voice commands," [online], [retrived Mar. 1, 2015]. Retrieved from Internet <URL: http://patseer.com>, 2015 (27 pgs).
"Gensim: Topic modelling for humans", [online], [retrieved Jul. 27, 2016]. Retrieved from Internet < URL: https://radimrehurek.com/gensim/index.html> (2pgs).
Google Code Archive—long term storage for Google Code Project Hosting, word2vec, "Tools for computing continuous distributed representations of words", [online] [retrieved Jul. 27, 2016]. Retrieved from Internet < URL: https://code.google.com/p/word2vec> (7pgs).
Sentiment Analysis—text-processing.com API 1.0 documentation, [online], [retrieved Jul. 27, 2016]. Retrieved from Internet < URL: http://text-processing.com/docs/sentiment.html> (2pgs).
The Stanford Natural Language Processing Group, "Software (/software/) >Stanford Relation Extractor", [online], [retrieved Jul. 27, 2016]. Retrieved from Internet < URL: http://nlp.stanford.edu/software/relationExtractor.html> (3pgs).
Sentiment Analysis with Python NLTK Text Classification, [online], [retrieved Jul. 27, 2016]. Retrieved from Internet <URL:http://text-processing.com/demo/sentiment/> (3pgs).
Non-Final Office Action dated Jul. 20, 2018, in related U.S. Appl. No. 15/268,488 (39 pgs).
Final Office Action dated Jan. 25, 2019, in related U.S. Appl. No. 15/045,116 (26 pgs).
Non-Final Office Action dated Jan. 25, 2019, in related U.S. Appl. No. 14/885,015 (33 pgs).
Fianl Office Action dated Jan. 3, 2019, in related U.S. Appl. No. 15/268,488 (13 pgs).
Gensim: Topic modelling for humans, URL:https://radimrehurek.com/gensim/index.html (2pgs).
Google Code Archive—long term storage for Google Code Project Hosting, word2vec, "Tools for computing continuous distributed representations of words," URL:https://code.google.com/p/word2vec/ (7pgs).
Sentiment Analysis—text-processing.com API 1.0 documentation, URL: http://text-processing.com/docs/sentiment.html (2pgs).
The Stanford Natural Language Processing Group, Software (/software/)>Stanford Relation Extractor, URL:http://nlp.stanford.edu/software/relationExtractor.html (3pgs).
Sentiment Analysis with Python NLTK Text Classification, URL:http://text-processing.com/demo/sentiment/ (3pgs).
Non-Final Office Action dated Aug. 10, 2017, in related U.S. Appl. No. 15/045,116 (30 pgs).
Response filed Nov. 10, 2017, in related U.S. Appl. No. 15/045,116 (19 pgs).
Non-Final Office Action dated Jun. 27, 2018, in related U.S. Appl. No. 15/045,116 (29 pgs).
Response filed Apr. 25, 2019, in related U.S. Appl. No. 14/885,015 (16pgs).
Response filed Apr. 25, 2019, in related U.S. Appl. No. 15/045,116 (15pgs).
Non-Final Office Action dated Jun. 17, 2019, in related U.S. Appl. No. 15/045,116 (26 pgs).
Fontoura et al.,"Inverted Index Support for Numeric Search," Sep. 12, 2005. [Online], [Retrieved Jun. 20, 2019], Retrieved from Interner <URL:http://fontoura.org/papers/paramsearch.pdf> (22 pgs).
Response filed Apr. 3, 2019, in related U.S. Appl. No. 15/268,488. (14pgs).
Non-Final Office Action dated Jul. 9, 2019, in U.S. Appl. No. 15/268,488. (14 pgs).
Final Office Action dated Aug. 7, 2019, in related U.S. Appl. No. 14/885,015 (38 pgs).
Response filed on Sep. 17, 2019, in related U.S. Appl. No. 15/045,116 (12 pgs).
Response filed Oct. 9, 2019, in related U.S. Appl. No. 15/268,488, (14pgs).
Final Office Action dated Dec. 10, 2019, in related U.S. Appl. No. 15/045,116, (27 pgs).
Non-Final Office Action dated Nov. 29, 2019, in related U.S. Appl. No. 14/885,015, (41 pgs).
Notice of Allowance and Fee Due dated Dec. 11, 2019, in related U.S. Appl. No. 15/268,488, (8 pgs).
Response filed Nov. 7, 2019, in related U.S. Appl. No. 14/885,015, (16pgs).

* cited by examiner

400

500

Command Vector Table

| Command | Command Attribute | Property 1: type | Property 2: length | Property 3: min value | Property 4: max value | Property n: ... |
|---|---|---|---|---|---|---|
| Interface VLAN | VLAN name | String | 64 chars | 1 | 64 | ... |
| Interface VLAN | VLAN ID | Integer | 4094 | 0 | 4093 | ... |
| Interface 10Gig | Interface name | String | 32 chars | 1 | 32 | ... |
| Interface 10Gig | Interface ID | Integer | 64 | 1 | 64 | ... |
| Interface 10Gig | MTU size | Integer | 10K | 64 | 10K | ... |
| ... | ... | ... | ... | ... | ... | ... |

TABLE 1

| Command | Command Attribute | Property1: type | Property 2: length | Property 3: value | Property 4: ... | Property n: Entity Relationship |
|---|---|---|---|---|---|---|
| Interface Ethernet | Type | Pre-Defined String | n/a | Fast-ethernet Gig-ethernet Tengig-ethernet | ... | nil |
| Interface VLAN | Name | String | 64 chars | ... | ... | nil |
| Interface VLAN | ID | Integer | 16 bits | 1 - 4093 | ... | nil |
| Command A | size | Integer | 16 bits | 64-10K | ... | nil |
| Command X | size | Integer | 16 bits | 64-10K | ... | Pointer to Entity-Relationship Table 2 |
| ... | ... | ... | ... | ... | ... | ... |

TABLE 2

| Command | Feature | Profile or Topology | Entity | Relationship Constraint |
|---|---|---|---|---|
| X-size | Routing | n/a | A-size | ( X-size < A-size ) ( X-size == A-size ) ( X-size ! > A-size ) |

| Rule | Entities Relationship Constraint Check | Result |
|---|---|---|
| 1 | Is ( X-size < A-size ) ? | Yes = Good<br>No = Bad |
| ... | ... | ... |

VALIDATION USING NATURAL LANGUAGE PROCESSING

CROSS-REFERENCE TO RELATED APPLICATION

This application is a continuation-in-part of and claims the benefit of and priority, under 35 U.S.C. § 120, to U.S. patent application Ser. No. 15/045,116, filed on Feb. 16, 2016, entitled "TEST VECTOR GENERATION FROM DOCUMENTATION," listing Sachinrao Panemangalore, Vinay Sawal, Vivek Dharmadhikari, Kuntal Patel, Gavin R. Cato, and Joseph L. White as inventors, which is a continuation-in-part of and claims the benefit of and priority, under 35 U.S.C. § 120, to U.S. patent application Ser. No. 14/885,015, filed on Oct. 16, 2015, entitled "DOCUMENT VERIFICATION," listing Sachinrao Panemangalore, Vinay Sawal, Vivek Dharmadhikari, Kuntal Patel, and Gavin R. Cato as inventors. Each of the aforementioned patent documents is incorporated by reference herein in its entirety.

BACKGROUND

A. Technical Field

The present disclosure relates to technical documentation and functional products. More particularly, the present disclosure relates to systems and methods that aids the process of assessing a network configuration by using information extracted from technical documentation for functional products, such as network devices and/or services.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data and communications have resulted in vast arrays of ever expanding networks that comprise information handling systems. As these networks evolve and expand, new features and functionality are added at different times and for different reasons. When designing new networks or deployments, it is important that the network function properly. However, given the complexity of such systems and the vastness of the technical documentation associated with the various functional products within the system, it is difficult to determine whether the configuration will have issues.

Regardless of the complexity of the task or amount of documentation, such networks can be critical; therefore, it is important that they be configured properly. Designing the network properly before deployment can result in avoiding costly problems when the network is in operation. Also, checking an existing configuration can help avoid or fix issues.

Given the complexity of today's technical product offerings, not only are the product features vast but they are also highly technical—making it quite difficult and laborious to check for errors. Accordingly, what is needed are systems and methods that help automate the process assessing a network configuration by using information extracted from technical documentation for functional products, such as, devices, services, or both.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 5 depicts an example command vector table (CVT) according to embodiments of the present disclosure.

FIG. 7 depicts an example command vector table or tables (CVT) with entity relationship constraint data according to embodiments of the present disclosure.

FIG. 8 depicts an example design command vector according to embodiments of the present disclosure.

DETAILED DESCRIPTION OF THE PREFERRED EMBODIMENTS

Figure 1:
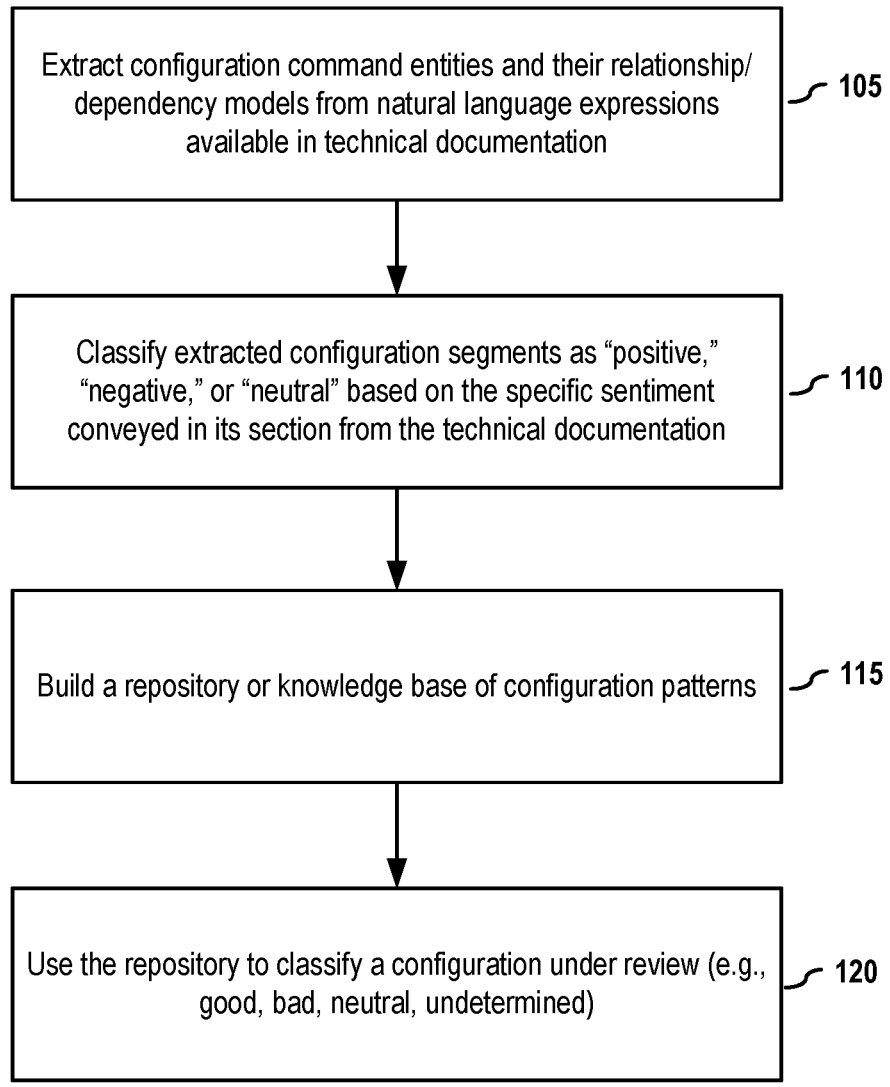
FIG. 1 ("FIG. 1") depicts a general overview methodology for assessing a design according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "data," "information," along with similar terms may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the current patent document include systems and methods of assessing a network configuration by using information extracted from technical documentation for functional products, such as network devices and/or services. In embodiments, one of the main objectives is to compare the configuration of a network against known network configuration patterns and, in embodiments, notify the network administrator of the anomalies in the network.

FIG. 1 depicts a general overview methodology for assessing a design according to embodiments of the present disclosure. In embodiments, configuration command entities and their relationship/dependency models are extracted (105) from natural language expressions available in documentation, such as technical designs, best practices literature, and recommendation documents. The extracted configuration segments are classified (110) as "positive," "negative," or "neutral" based on the specific sentiment conveyed in the document section. In embodiments, a repository or knowledge base of configuration patterns is built (115), and this repository may be used to classify (120) a configuration under test or review. In embodiments, the classification may be that the configuration is good, bad, neutral, or undetermined.

In embodiments, the command vector table and the command template sequence may be used to generate (120) one or more design vectors for testing on the product.

Figure 2:
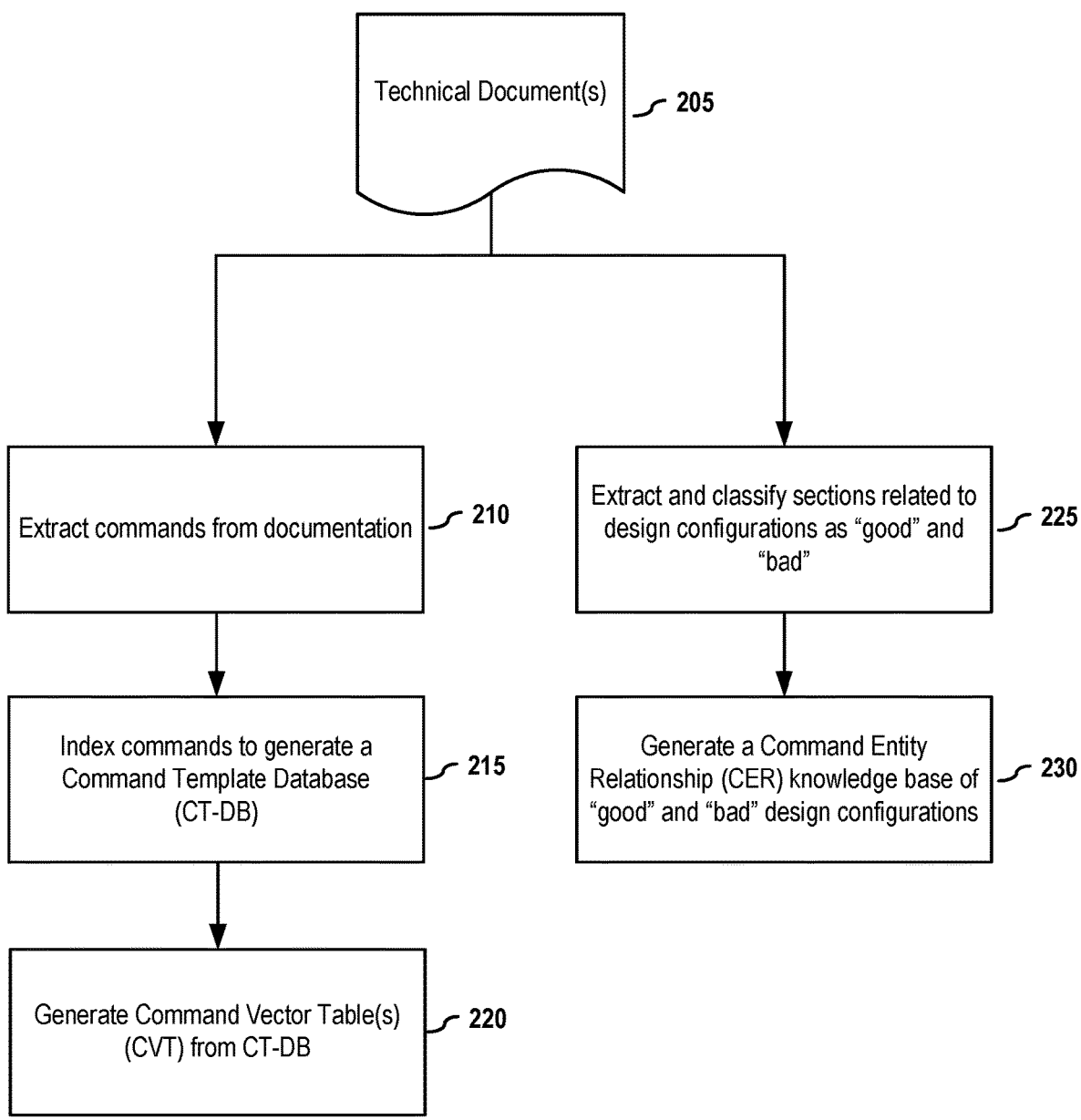
FIG. 2 depicts a method for generating a command template database (CT-DB), a command vector table or database (CVT), and a command entity relationship graph or database (CER) from documentation according to embodiments of the present disclosure.

FIG. 2 depicts a method for generating a command template database (CT-DB), a command vector table or database (CVT), and command entity relationship database or knowledge graph (CER) from documentation according to embodiments of the present disclosure. As shown in FIG. 2, one or more technical documents 205 are used to generate the CT-DB, CVT, and CER. As will be explained in more detailed below, in embodiments, the CT-DB is generated from the technical document(s) by extracting (210) commands and indexing (215) them. In embodiments, a command template database (CT-DB) is built from commands extracted from one or more technical documents related to a product, which may be a device, service, or combination thereof. The term "command," which may also be referred to herein as a configuration setting, shall be understood to cover a broad array of elements, such as a command-line-interface (CLI) command, an application programming interface (API), a Representational State Transfer (REST) API, an operation, a call, a query, an input, a request, a script, etc.

As will be explained in more detailed below, in embodiments, the CVT is generated (220) from the CT-DB by extracting attributes associated with the extracted commands on which the functionality of a product may be tested. In embodiments, the attributes may have specific types, ranges of values, etc.

Also depicted in FIG. 2, the technical document(s) are used to extract and classify (225) sections related to design configurations (such as, "good" and "bad"—although other classifications may also be used). The extracted and classified design configurations are used to create (230) a command entity relationship knowledge graph.

B. Database Generation

1. Generating a Command Template Database (CT-DB)

Figure 3:
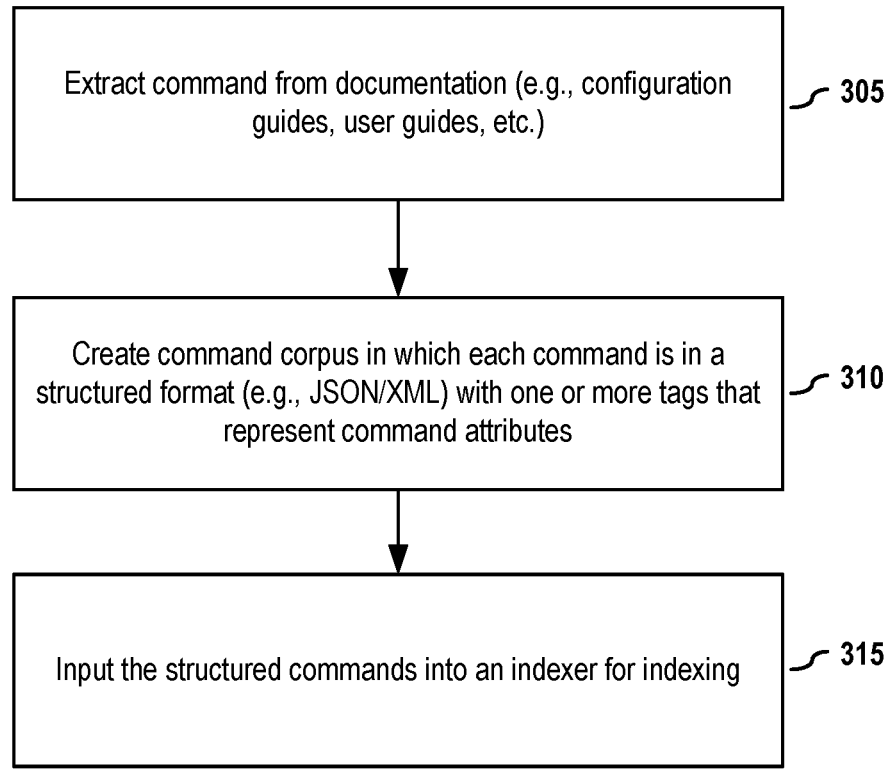
FIG. 3 depicts an example of a method for building a command template database according to embodiments of the present disclosure.

In embodiments, a command template database is consulted in a design vector system for generating the command vector table database, which is used to lookup a command and/or command-attributes parameters or properties (e.g., type, maximum value, minimum value, or other documented constraints) for the particular product. In embodiments, a term frequency-inverse document frequency (TF/IDF)-based ranking function is used to get the most relevant match for a command query input. In embodiments, the APACHE LUCENE index engine may be used to index commands (e.g., CLIs and REST APIs) for template lookup. FIG. 3 depicts an example of a method for building a command template database according to embodiments of the present disclosure.

(i) Command Extraction

FIG. 3 depicts an example of a method for building a command template database according to embodiments of the present disclosure. As shown in embodiment depicted in FIG. 3, the process commences by extracting (305) commands from documentation. In embodiments, manual, semi-manual (using regular expressions, python, etc.), automatic methods, or combinations thereof may be used to extract commands from documentation, such as configuration guides and other source materials. For example, font type and/or size and known precursor statement (e.g., <word>#, I for options, [ ] or ( ) for options, etc.) of the command-syntax may be used to extract command features. In embodiments, copying and pasting command definition tables from portable document format (PDF) files into command definition files tended to be more accurate than statistical models, although statistical models may also be used to automate the extraction. One skilled in the art shall recognize that there are many ways in which to extract or "mine" content, such as tables and other multi-column structures, from PDF and other documentation files in a deterministic way, and such approaches may be utilized herein.

In embodiments, a document may comprise a command definition data set associated with the product. For example, a command definition data set, such as a YANG ("Yet Another Next Generation") data model, may be included with the source code of a product release, whether a new product release or an update release. A YANG model explicitly determines or defines the structure, semantics, and syntax of data, which can be configuration and state data. It should be noted that while references are made in this patent document to YANG models, other data models, schema, and the like (which may be referred to herein generally as a "structured data set," a "definition data set," or the like) may also be used. In embodiments, the structured data sets may be part of the documentation and used to extract information about commands.

(ii) Command Indexing

Returning to FIG. 3, in embodiments, a command corpus is created (310) in a structured format (e.g., JavaScript Object Notation (JSON)/Extensible Markup Language (XML)) and it is labelled with one or more tags. In embodiments, the tags may include such things as key-value pairs (e.g., [interface_type:vlan], [name:vlan_name], etc.). The extracted commands may then, in embodiments, be inputted (315) into an indexer, such as LUCENE, for indexing to create one or more indexes of the target-specific command templates. It shall be noted that this is trivial from the LUCENE API point of view, in which the path to the JSON/XML documents are passed to the LUCENE Index API. The output is a set of indexes. These indexes may be used as part of a lookup when the test vector generation system wants to match the most relevant command object to the query command input.

2. Generating a Command Vector Table (CVT)

Figure 4:
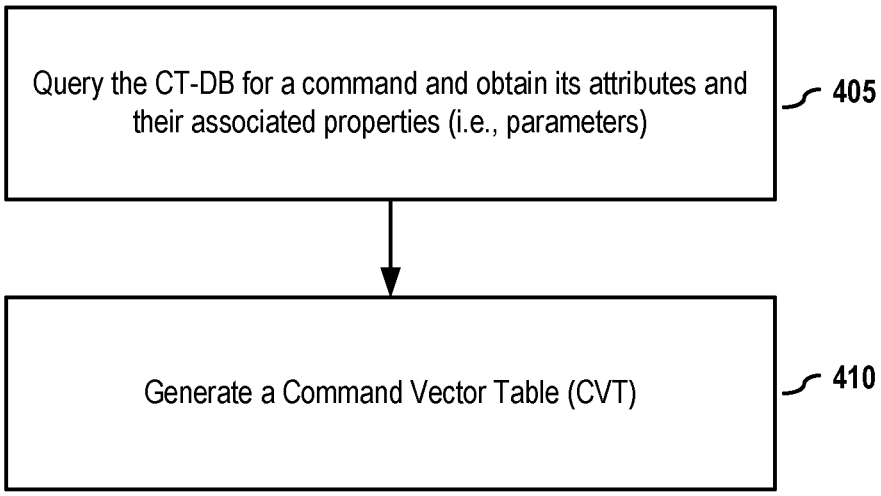
FIG. 4 depicts an example methodology for generating a command vector table (CVT) according to embodiments of the present disclosure.

FIG. 4 depicts an example methodology for generating a command vector table (CVT) according to embodiments of the present disclosure. As shown in FIG. 4, in embodiments, a command template database (CT-DB) may be queried (405) for a command to obtain its attributes and their associated properties. Given a command and its attributes and their associated properties, a table may be generated (410) that summarizes this information.

Consider by way of example, the sample command vector table 500 in FIG. 5. As shown in FIG. 5, a command 505 (e.g., "interface VLAN") is included in the table 500 with its associated attribute(s) 510 (e.g., VLAN name and VLAN ID) and their associated property or properties 515 (e.g., type, length, minimum value, maximum value, etc.). This information is beneficially used to understand constraints for a design.

For example, in embodiments, the CVT is a tabulation of information in the CT-DB by parsing individual commands and associating attributes and their respective constraints to a command. Consider, by way of example, creating a CVT entry for "interface vlan" from documentation, such as product configuration guide, from which attributes and constraints for "interface vlan" are extracted. An excerpt from an S4810 configuration guide includes the following:

"Virtual LANs, or VLANs, are a logical broadcast domain or logical grouping of interfaces in a LAN in which all data received is kept locally and broadcast to all members of the group. When in Layer 2 mode, VLANs move traffic at wire speed and can span multiple devices. FTOS supports up to 4093 port-based VLANs and 1 Default VLAN, as specified in IEEE 802.1Q. Note: E-Series ExaScale platforms support 4094 VLANs with FTOS version 8.2.1.0 and later. Earlier ExaScale supports 2094 VLANS."

From this excerpt, it can be extracted that this platform supports 4093 interface VLANS.

A YANG model representation of interface VLAN is as follows:

```
list entry {
    key "ifindex";
    description "This grouping defines vlan interface object";
    leaf id {
        type base-cmn:vlan-id;
        description "the vlan id associated with interface";
    }
    leaf ifindex {
        type base-cmn:logical-ifindex;
        description "index received from to/kernel for interface";
    }
    leaf name {
        type string;
        description "Name associated with the interface";
    }
    leaf mac-address {
        type base-cmn:mac-address;
        description "Vlan interface MAC Address";
    }
    leaf ip-address{
        type base-cmn:ipv4-address;
        description "IP address associated with the VLAN";
    }
    leaf num-ports-untagged {
        type uint32;
        description "number of members in the VLAN interface";
```

```
}
leaf-list untagged-ports {
    type base-cmn:logical-ifindex;
}
leaf num-ports-tagged {
    type uint32;
    description "number of members in the VLAN interface";
}
leaf-list tagged-ports {
    type base-cmn:logical-ifindex;
}
leaf enable-statistics {
    type boolean;
    description "Enable/Disable statistics";
}
leaf learning-mode {
    type boolean;
    description "Enable/Disable learning per VLAN";
}
}
```

Based on these two sets of data, a Command Template database may be created as previously discussed. Note that command attributes of interest may be selected; that is, in embodiments, not each and every attribute for a given command need be entered into the CT-DB. Presented below is an example template for the CT-DB:

```
{
    [
        { command: create vlan <vlan-id>
            vlan-id : {
                type: "int"
                range: { 1, 4093 }
                except: { }
            }
            level: "config"
            creates_context: vlan
        },
        { command: vlan name <vlan-id> <vlan-name>
            vlan-id : {
                type: "int"
                range: { 1, 4093 }
                except: { }
            }
            vlan-name: {
                type: "string"
                range : { [a-zA-Z0-9]* }
                except: { }
            }
            level: vlan
            creates_context: none
        }
    ]
}
```

Once the CT-DB is prepared, individual commands and their attributes may be tabulated into a table in the CVT by parsing the CT-DB. Thus, in embodiments, for each command selected from the CT-DB or for each command in the CT-DB, its corresponding command template in the CT-DB is parsed to tabulate at least some of its associated attributes and parameters into a CVT record.

3. Generating a Command Entity Relationship (CER) Database

Figure 6:
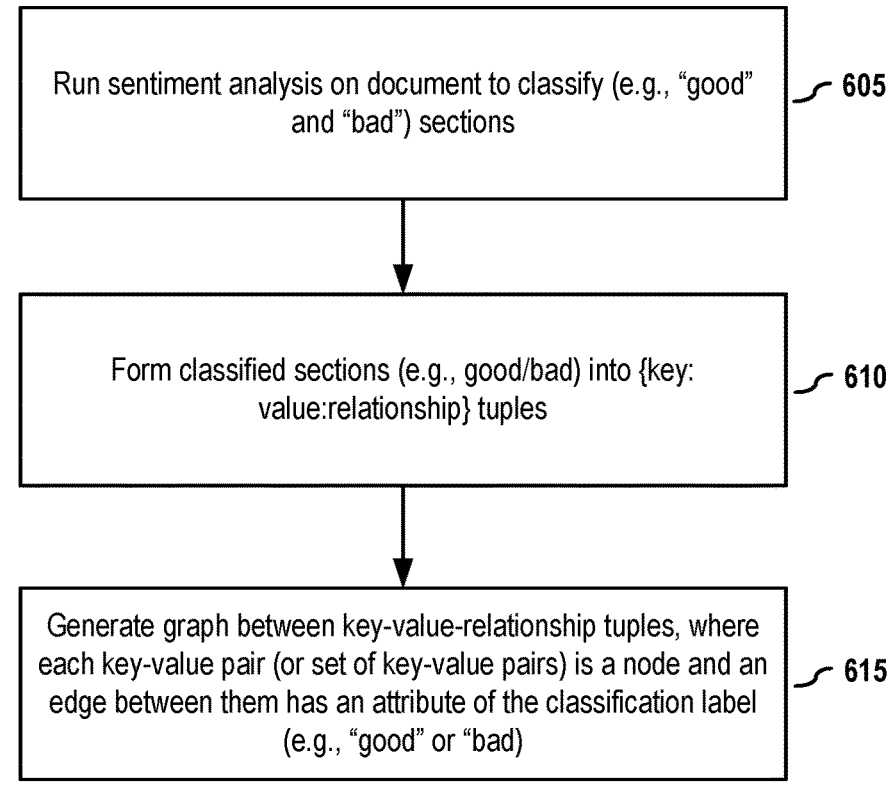
FIG. 6 an example methodology for generating a command entity relationship (CER) according to embodiments of the present disclosure.

FIG. 6 an example methodology for generating a command entity relationship (CER) according to embodiments of the present disclosure. In embodiments, sentiment analysis may be performed (605) on a document to classify "good" and "bad" sections. In embodiments, the Natural Language Tool Kit (NLTK) sentiment analysis library (which is available online at text-processing.com/docs/sentiment.html) may be used for this purpose. For example, Hierarchical Classification and Sentiment Polarity are some sentiment analysis algorithms in the NLTK that may be used for subjectivity and polarity analysis, although those skilled in the art shall recognize that other approaches or tools may be used.

Next, in embodiments, the classified sections (e.g., good, bad) may be split or formed (610) into {key: value:relationship} tuples. In embodiments, the "key" is a keyword identified in the document, which may include using association between image and label, recognizers like Stanford NER/NLTK, and using features like font, colors, and/or positioning. In embodiments, the "values" are extracted from the same section using proximity rules (such as n-gram association). In embodiments, the relationship may be a classification, such as {less-than, greater-than, equals, not, equals, power-of, factor-of} or a logical composite, but it should be noted that this set may be reduced or extended in implementation. Tools, such as Stanford Relation Extractor (currently available at nlp.stanford.edu/software/relationExtractor.html), may be used an entity-relationship generator.

In embodiments, a graph or graphs may be generated (615) between key-value-relationship tuples—where each key-value pair (or set of key-value pairs) is a node and an edge between them has attribute of its label (e.g., "good" if the section in which the key-value is present was labeled as "good" and similarly "bad" if labelled "bad"). Doing this, a knowledge base (KB) of good and bad design patterns is generated. The knowledge base may be organized as a "rule book" with individual sections for each feature. In embodiments, it may have patterns such as for L2/L3 protocols like STP (Spanning Tree Protocol), Open Shortest Path First (OSPF), Border Gateway Protocol (BGP), Enhanced Interior Gateway Routing Protocol (EIGRP), and the like, or services like Fiber Channel Ethernet (FCoE), Data Center Bridging (DCB), and the like.

FIG. 7 depicts an example command vector table or tables (CVT) with entity relationship constraint data according to embodiments of the present disclosure. As seen in FIG. 7, the table 700 includes a command 705 (e.g., "interface VLAN") is included in the table 725 with its associated attribute(s) 710 (e.g., VLAN name and VLAN ID) and their associated property or properties 715 (e.g., type, length, minimum value, maximum value, etc.). It shall be noted, however, that an additional column 720 in the table 725 indicates an entity relationship constraint. In the depicted example, an entity relationship may reference 722 one or more additional tables, such as Table 2 750, that provide additional information. This information may be used for design verification.

C. Design Vectors

In embodiments, design vectors effectively are or include "rules" that can be used to validate design conformance of a command, a command attribute, a feature, etc. against another command, a set of commands, a feature, a specific topology, etc. In embodiments, the rules are constructed from entity relationship constraints. For example, in embodiments, rules may be constructed by parsing, using for example a python script, entity-relationship constraints.

FIG. 8 depicts an example design command vector according to embodiments of the present disclosure.

Figure 9:
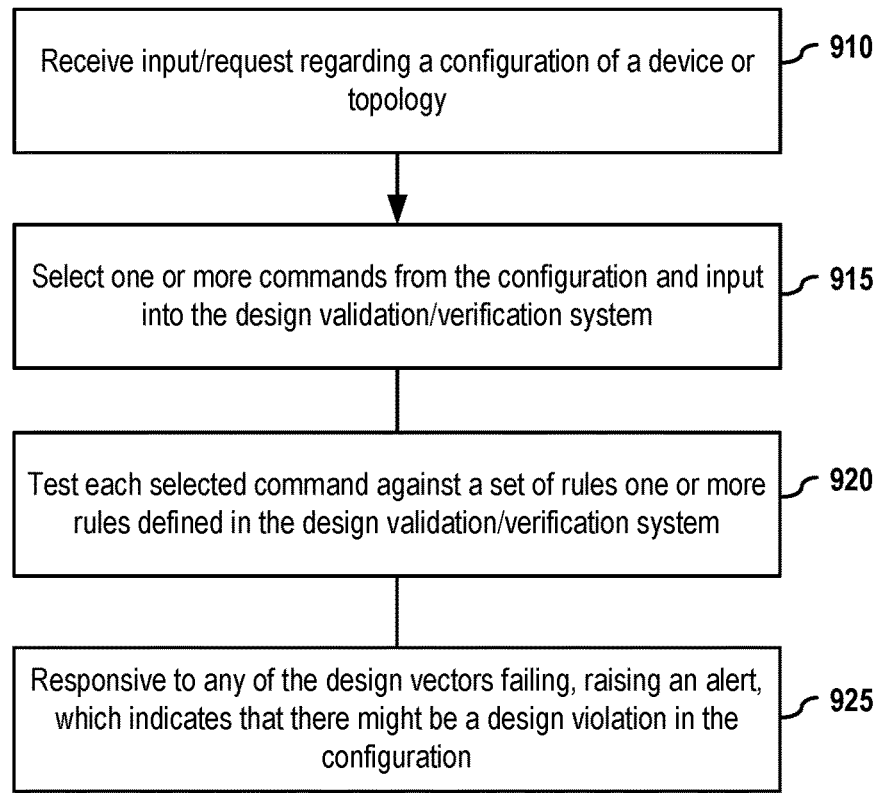
FIG. 9 depicts an example methodology for generating and testing a design vector according to embodiments of the present disclosure

Embodiments of design vector generation and design verification are presented below. FIG. 9 depicts an example methodology for generating and testing a design vector according to embodiments of the present disclosure. In embodiments, an input or request command (which may include a set of commands) regarding a configuration of a device/system or a topology is received (910). In embodiments, one or more commands about the configuration are selected (915) and inputted into a design validation system. In embodiments, the selection process may be initiated as part of an automatic process or may be user initiated. For example, in embodiments, depending on the complexity of a command, it may be dissected into named entities and each named entity may be used to checked through the validation process. Each selected command may then be tested (920) against a set of rules defined in the design validation system In embodiments, given a command, the command may be queried against the command value table (CVT) to identify the attributes and their associated properties. In embodiments, the values for attributes may be extracted from the input. Alternatively, a user may be prompted to provide values or may provide values as part of an input/request. In yet another embodiment, the values may be a set of typical values for testing or other values that are points or values of interest for testing. For example, the command attributes may be generated that test for the upper, mid, and lower range of values. It shall be noted that values may be continuous (e.g., min/max, step, range) or discrete (e.g. disjoint set) values. In embodiments, at least one or more of the values may be obtained from querying the product upon which the test vector will be tested. For example, a VLAN ID may be obtained by querying the product. In embodiments, a combination or combinations of the above-mentioned embodiments may be used.

Given the attributes of the command, the command may be assessed by being queried against the command entity relationship (CER) to ascertain whether command with its attribute is in conformity with design vectors or rule(s) related to the command as identified in the CER. In embodiments, responsive to a design vectors failing, an alert, which indicates that there might be a design violation in the configuration, may be raised (925).

In embodiments, the process may be repeated by selecting another configuration command to be examined.

D. System Embodiments

1. Natural Language Processing (NPL) System

Figure 10:
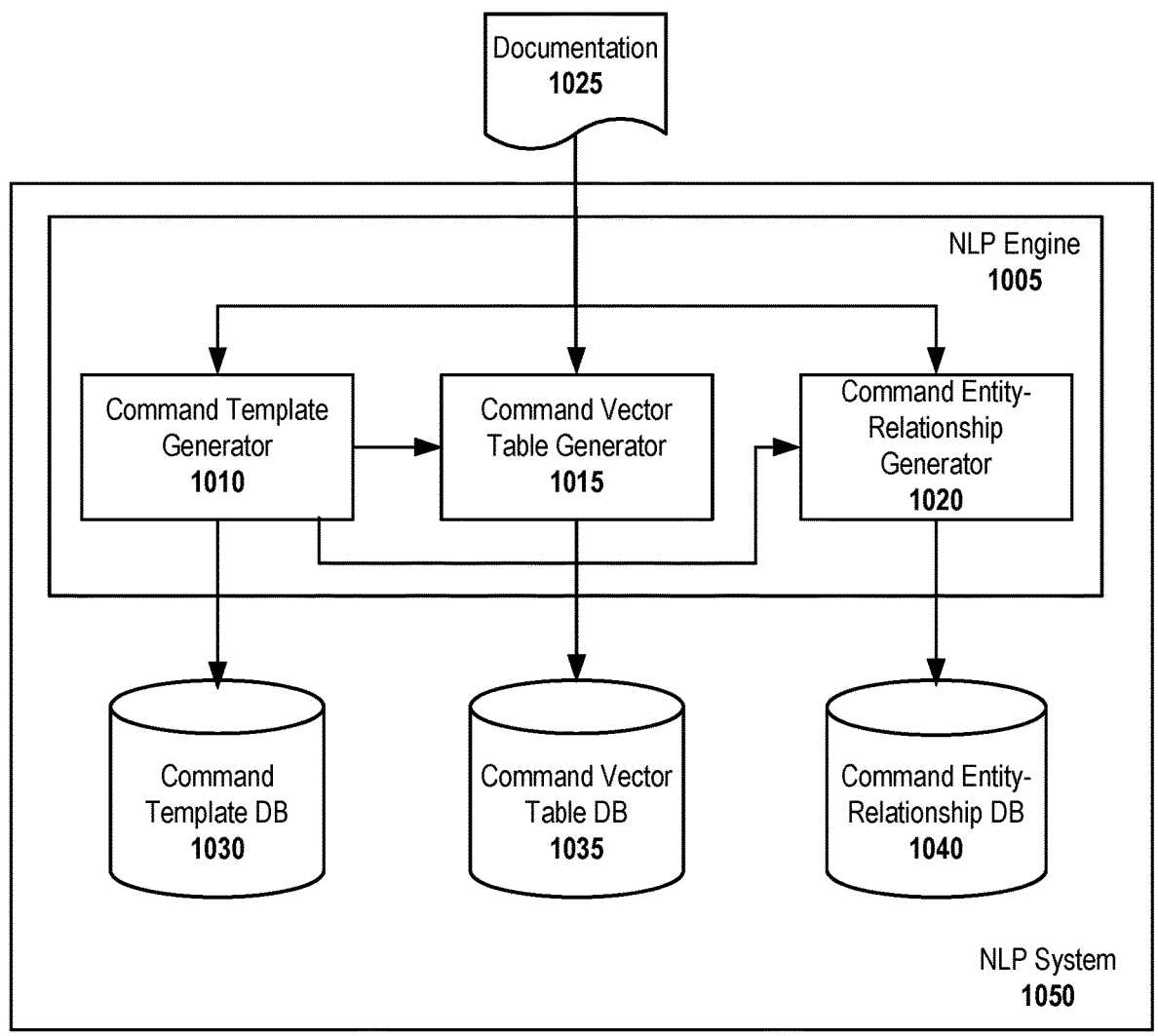
FIG. 10 depicts a natural language processing (NLP) system for generating data for a design validation system from documentation according to embodiments of the present disclosure.

FIG. 10 depicts a natural language processing (NLP) system for generating data for a design validation system from documentation according to embodiments of the present disclosure. In the depicted embodiments, the system 1050 receives as input documentation 1025 from which a command template database 1030, a command vector table database 1035, and a command entity-relationship database 1040 are created. In embodiments, the system 1050 comprises a natural language processing (NLP) engine 1005 and memory for storing the aforementioned databases.

In embodiments, the NLP engine 1005 comprises three subsystems: a command template generator 1010; a command vector table generator 1015; and a command entity-relationship generator 1020.

In embodiments, the command template generator 1010 receives as input the documentation 1025 and generated the command templates. In embodiments, the command template generator 1010 generates the command templates for the command template database 1030 using one or more of the methods disclosed above with respect to FIG. 2 and FIG. 3.

In embodiments, the command vector table generator 1015 receives as inputs the documentation and commands from the command template generator 1010 (or alternatively, or additionally, from the command template database 1030) and generates command vector tables for the commands. In embodiments, the command vector table 1015 generates the command vector tables for the command vector table database 1035 using one or more of the methods disclosed above with respect to FIG. 2, FIG. 4, and FIG. 5.

In embodiments, the command entity relationship generator 1020 receives as inputs the documentation and commands from the command template generator 1010 (or alternatively, or additionally, from the command template database 1030) and generates command entity relationship graphs for the commands. In embodiments, the command entity relationship generator 1020 generates the command entity relationship graphs for the command entity relationship graphs/database 1040 using one or more of the methods disclosed above with respect to FIG. 2, and FIGS. 6-8.

2. Design Validation Generator System

Figure 11:
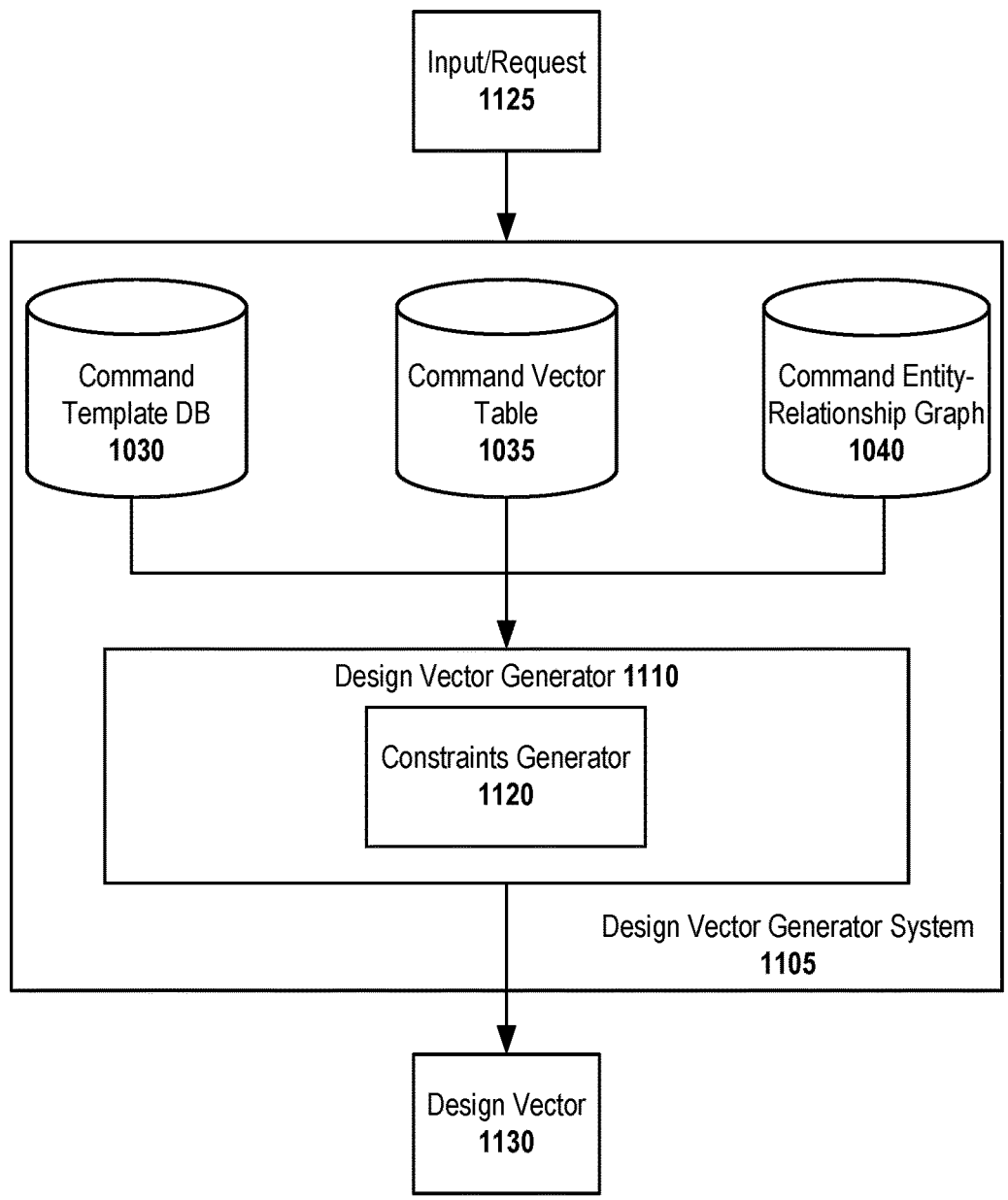
FIG. 11 depicts an embodiment of a design vector generator system for generating a design vector from documentation and an input/request according to embodiments of the present disclosure.

FIG. 11 depicts a design validation generator system 1105 for generating a design vector according to embodiments of the present disclosure. In the depicted embodiments, the system 1105 receives an input or request 1125, which may comprise a request about a specific command or configuration, and outputs a corresponding design vector 1125. In embodiments, the system 1105 comprises a command template database 1030, a command vector table database 1035, a command entity relationship database 1040, each of which may be obtained from a natural language processing (NLP) system, such as disclosed in FIG. 10. In embodiments, the design vector generator system 1105 also comprises a design vector generator 1110 that is communicatively coupled to the aforementioned databases 1030-1040 and uses that information to generate a design vector for the command or configuration of interest 1120.

In embodiments, given a configuration command, the constraints generator 1120 obtains attributes and properties or constraints about which a design vector may be generated. For example, in embodiments, given a command related to the input configuration, the constraints generator 1130 may query the command value table (CVT) database 1035 to obtain the command's attributes and their associated properties, such as value ranges. The constraints generator 1120 may extract values from the input configuration, assign values, or a combination thereof. In embodiments, the assigned values may be randomly selected from within an acceptable set of values for an attribute. Alternatively, a user may be prompted to provide values or may provide values as part of the input/request 1125. In yet another embodiment, the values may be a set of typical values. For example, design vectors may be generated that test for the upper, mid, and lower range of values. It shall be noted that values may be continuous (e.g., min/max, step, range) or discrete (e.g., disjoint set) values. In embodiments, at least one or more of the values may be obtained from querying one or more products within the configuration, if available. In embodiments, a combination or combinations of the above-mentioned embodiments may be used.

In embodiments, after values have been assigned to the various elements, the design vector 1125 is output.

Figure 12:
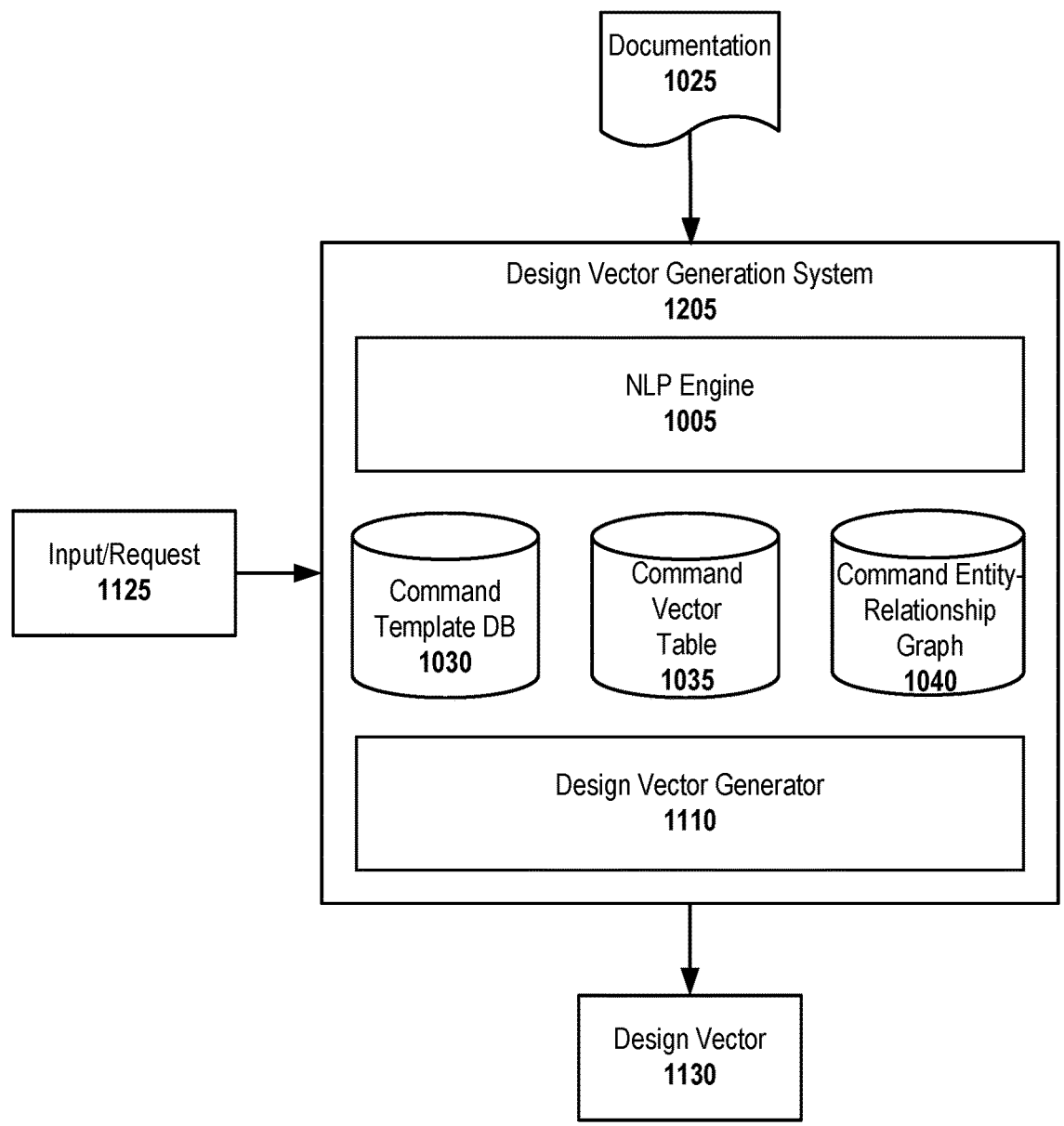
FIG. 12 depicts an alternative embodiment of a design vector generator system for generating a design vector from documentation and an input/request according to embodiments of the present disclosure.

FIG. 12 depicts an alternative embodiment of a design vector generator system 1205 for generating a design vector from documentation and an input/request according to embodiments of the present disclosure. As shown in FIG. 12, the design vector generation system 1205 may comprise the natural language processing subsystem 1005 (such as, by way of example, the system described with respect to FIG. 10) and the test vector generator 1110 (such as, by way of example, the system described with respect to FIG. 11). Such a system has the capabilities to generate a command template database 1030, a command vector table database 1035, and a command entity-relationship database 1040 from input documentation 1025 and to use the databases to generate a design vector 1130 for a requested configuration command or commands 1125.

3. Design Vector Generator & Verification System

Figure 13:
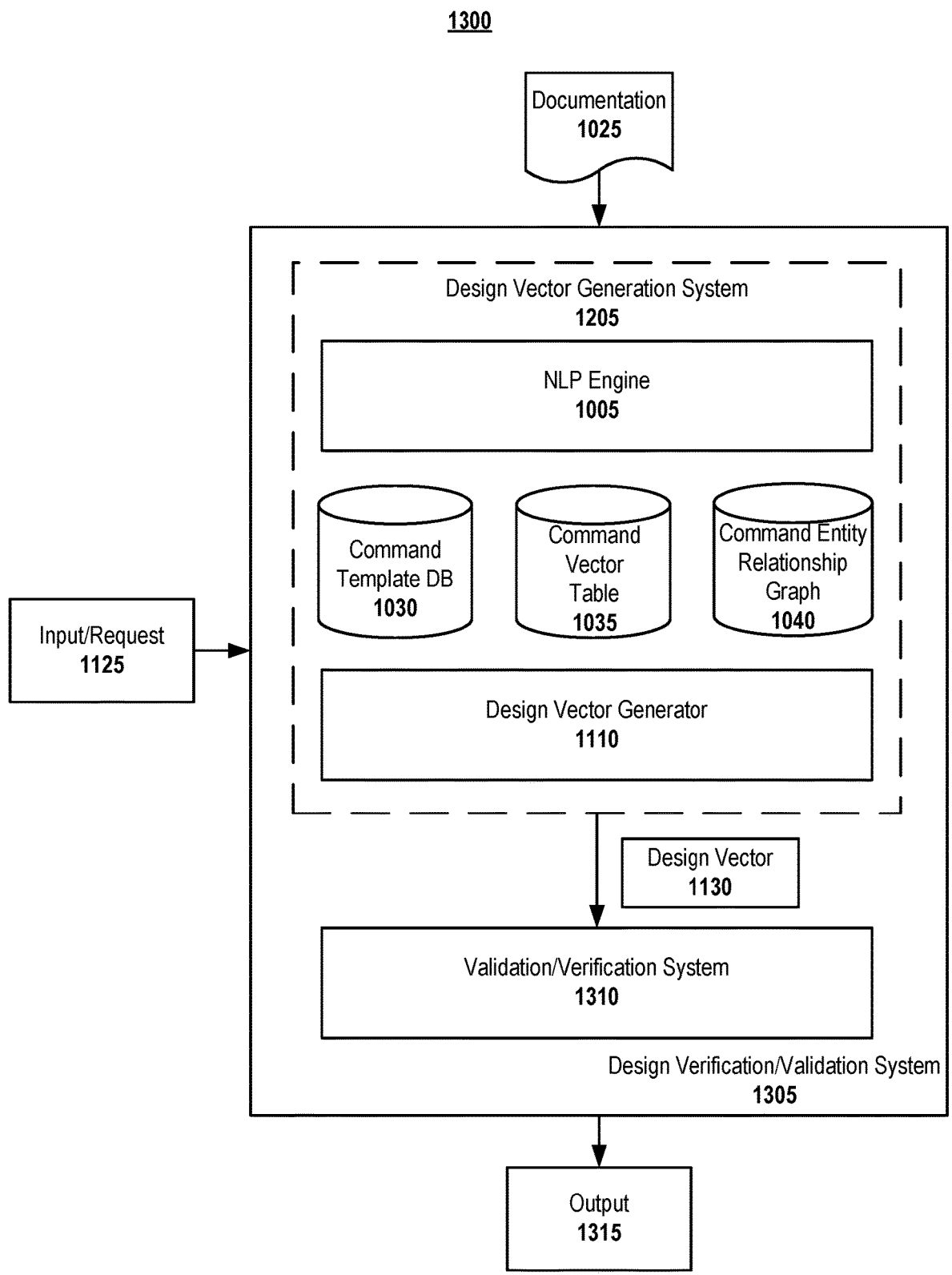
FIG. 13 depicts a design verification system for generating and verifying a design vector from an input and documentation according to embodiments of the present disclosure.

FIG. 13 depicts a design verification system 1305 for generating and verifying a design vector from an input and documentation according to embodiments of the present disclosure. As shown in FIG. 13, the design verification system 1305 may comprise a design vector generation system 1205 (such as, by way of example, the system described with respect to FIG. 12) and a verification system 1310. In embodiments, the verification system 1310 receives a design vector from the design vector generator system 1205 and provides an output of the design vector based upon the rules.

In embodiments, the verification system 1310 may also provide additional tools and features including, reporting, notifications, alerts, diagnostics, displays of outputs, etc. In embodiments, the verification system may be automated or may request user inputs.

Consider, by way of illustration, the following example. In documentation, it includes the following maximum transmission unit (MTU) usage guideline:

It is a good idea to keep ip mtu less than link mtu otherwise packet fragmentation will occur.

Running a sentiment analysis (such as, by using Sentiment Analysis with the Python NLTK Text Classification tool, which is available at text-processing.com/demo/sentiment/) on the above-mentioned statement yields following results:

Subjectivity:
neutral: 0.2
polar: 0.8
Polarity:
positive: 0.6
negative: 0.4
Sentiment Analysis Result:
The text is Positive.

The above-mentioned tool is not yet trained but still provides good results. In embodiments, a trained sentiment analysis model trained in the context of networking may provide even better results.

Returning to the example, it is shown that the statement from the documentation has a higher probability of being positive. Performing entity-relationship extraction on the statement yields the named entities and their relationship in key-value-relation:

```
{
    key: "ip mtu"
    value: {
        key 1: "interface mtu",
        relation: "less than"
    }
}
```

As illustrated in the above example, it shall be noted that a "value" as used herein may be another tuple that contains a corresponding entity (e.g., "interface mtu") and a relationship (e.g., "less than") it asserts to the key.

Using the entity-relationship database, a design vector table is constructed as mentioned earlier:

TABLE A

| Rules | Entities Relationship constraint check | Result |
|---|---|---|
| 1 | Is (IP MTU size < Interface MTU) | Yes = No problem<br>No = Red flag |
| 2 | ... | ... |

In embodiments, operation values and relevant information may be collected from the device, such as from running-configuration. A portion of such configuration data is provided below with relevant information underlined:

```
Force10#show running-config interface gigabitethernet 2/0
!
interface GigabitEthernet 2/0
ip address 1.1.1.1/24
    ip mtu 1500
    mtu 1554
    no shutdown
!
!
...
Force10#show interface gigabitethernet 2/0
    GigabitEthernet 2/0 is up, line protocol is up
    Hardware is Force10Eth, address is 00:01:e8:05:f7:fc
    Current address is 00:01:e8:05:f7:fc
    Interface index is 474791997
    Internet address is 1.1.1.1/24
    MTU 1554 bytes, IP MTU 1500bytes
    LineSpeed 1000 Mbit, Mode full duplex, Master
    ARP type: ARPA, ARP Timeout 04:00:00
    Last clearing of "show interfaces" counters 00:12:42
    Queueing strategy: fifo
...
```

A table populated from the above-mentioned CLI configuration is provided below:

TABLE B

| Command | Attribute | Property 1: type | Property 2: length | Property 3: value | Property: Entity-Relationship |
|---|---|---|---|---|---|
| Interface Ethernet | Type | Pre-defined String | n/a | Gigabitethernet 2/0 | nil |
| Interface MTU | Size | Integer | 16 bits | 1554 | nil |
| IP MTU | Size | Integer | 16 bits | 1500 | Pointer to Entity-Relationship table |
| ... | ... | ... | ... | ... | ... |

In this case, a design vector would include information from Table A and Table B, above. This vector information validated, such as by the Verification System 1310, by evaluating or executing the rule or rules to yield following result:

| Rules | Entities Relationship constraint check | Result |
|---|---|---|
| 1 | Is (IP MTU size = 1500 < Interface MTU = 1554) | Yes = No problem |
| 2 | ... | ... |

One skilled in the art shall recognize a number of potential uses for such systems disclosed herein. For example, such systems may be used to verify one or more command of a specification of a product against deployments. Or, in embodiments, such systems may be used to validate a deployment guide relative to a user guide. Or, in embodiments, such systems may be used to test interoperability between devices. Or, in embodiments, such systems may be used to test platform dependent features of a product. It shall be noted that the aforementioned use cases are only some example, and one skilled in the art shall recognize a number of potential applications of such systems.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 14:
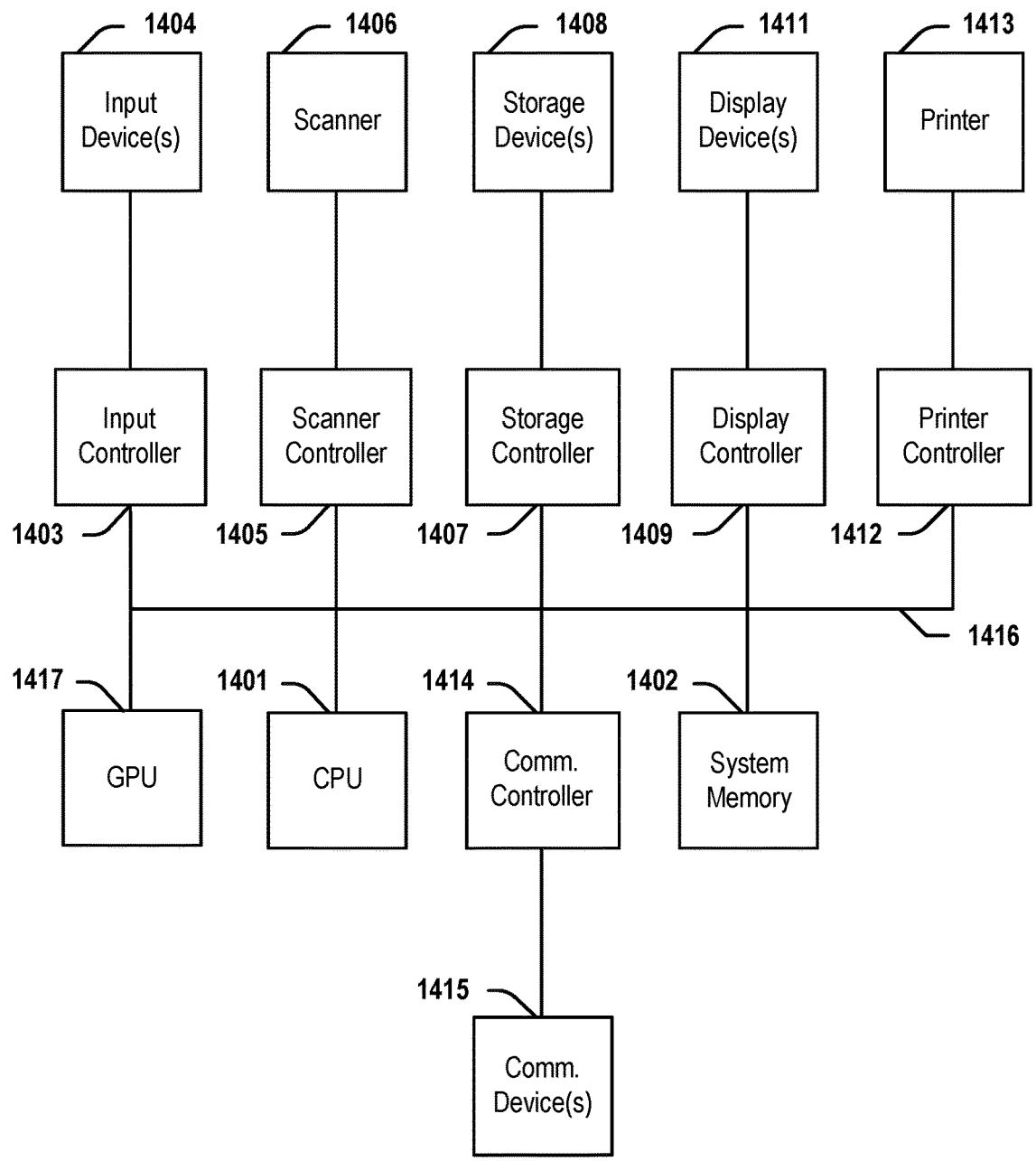
FIG. 14 depicts a simplified block diagram of an information handling system according to embodiments of the present invention.

FIG. 14 depicts a block diagram of an information handling system 1400 according to embodiments of the present invention. It will be understood that the functionalities shown for system 1400 may operate to support various embodiments of an information handling system—although it shall be understood that an information handling system may be differently configured and include different components. As illustrated in FIG. 14, system 1400 includes a central processing unit (CPU) 1401 that provides computing resources and controls the computer. CPU 1401 may be implemented with a microprocessor or the like, and may also include a graphics processor and/or a floating point coprocessor for mathematical computations. System 1400 may also include a system memory 1402, which may be in the form of random-access memory (RAM) and read-only memory (ROM).

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities and applications which may include embodiments of programs that implement various aspects of the present invention. Storage device(s) 1408 may also be used to store processed data or data to be processed in accordance with the invention. System 1400 may also include a display controller 1409 for providing an interface to a display device 1411, which may be a cathode ray tube (CRT), a thin film transistor (TFT) display, or other type of display. The computing system 1400 may also include a printer controller 1412 for communicating with a printer 1413. A communications controller 1414 may interface with one or more communication devices 1415, which enables system 1400 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for generating a design vector related to a functional product, the method comprising:
    generating a command template database (CT-DB) comprising one or more commands related to configuring the functional product by extracting commands from technical documentation using natural language processing;
    generating, using the command template database, a command vector table (CVT) database comprising, for each command of a set of commands, at least some of its attributes and parameters;
    generating, using the technical documentation, a command entity-relationship dataset (CER) that associates a configuration setting with one or more relationship constraints which, when evaluated, provide a validity assessment of the configuration setting; and
    generating a design vector for the configuration setting of the functional product by:
        obtaining, for the configuration setting, at least some of its attributes and parameters from command vector table database;
        obtaining, for the configuration setting, one or more relationship constraints from the command entity-relationship dataset; and
        obtaining values for at least some of the attributes and parameters for the configuration setting to be validated using at least one of the one or more relationship constraints.

2. The computer-implemented method of claim 1 wherein the configuration setting comprises one or more of a command line interface (CLI) command, an application program interface (API), operation, call, query, script, or input.

3. The computer-implemented method of claim 1 wherein the step of generating a command template database (CT-DB) comprising one or more commands related to configuring the functional product by extracting commands from the technical documentation using natural language processing comprises:
    extracting the one or more commands from the technical documentation related to the functional product;
    creating a command corpus of structured commands in which each command is in a structured format; and
    inputting the structured commands into an indexer for indexing.

4. The computer-implemented method of claim 1 wherein the step of generating, using the command template database, a command vector table database comprising, for each command of a set of commands, at least some of its attributes and parameters comprises:
    for each command, parsing its corresponding command template from the CT-DB to tabulate at least some of its attributes and parameters into a CVT record.

5. The computer-implemented method of claim 1 wherein the step of generating, using the technical documentation, a command entity-relationship dataset (CER) that associates a configuration setting with one or more relationship constraints which, when evaluated, provide a validity assessment of the configuration setting comprises:
    performing a sentiment analysis on technical documentation to classify one or more sections into one or more categories that assess a validity of the configuration setting; and
    for at least one classified section of the one or more sections, forming a grouping that associates a key, a value, and a relationship constraint, in which the key represents a configuration setting keyword, the value represents a tuple that comprising a corresponding entity and its relationship to the key, and the relationship constraint represents one or more rules for use in providing a validity assessment of the configuration setting.

6. The computer-implemented method of claim 5 further comprising:
    generate a graph using groupings, wherein each key-value pair of a grouping is a node in the graph and an edge between nodes has a classification label associated with a validity assessment.

7. The computer-implemented method of claim 1 further comprising:
    evaluating the design vector to obtain a validity assessment of the configuration setting.

8. The computer-implemented method of claim 7 further comprising the step of:
    responsive to the design vector receiving a negative validity assessment, raising an alert to indicate that there is a potential a design configuration violation.

9. The computer-implemented method of claim 7 further comprising:

evaluating the design vector to verify a configuration prior to implementing the configuration.

10. A computer-implemented method for generating a design vector from technical documentation related to a functional product comprising:
   receiving an input request regarding a configuration setting of the functional product;
   generating a design vector for the configuration setting by:
      obtaining, for the configuration setting, at least some of its attributes and parameters from a command vector table database, the command vector table database comprising, for each configuration setting of a set of configuration settings, at least some of its attributes and parameters;
      obtaining, for the configuration setting, one or more relationship constraints from the command entity-relationship dataset, the command entity-relationship dataset associating the configuration setting with one or more relationship constraints which, when evaluated, provide a validity assessment of the configuration setting; and
      obtaining values for at least some of the attributes and parameters for the configuration setting to be validated using at least one of the one or more relationship constraints; and
   evaluating the design vector to obtain a validity assessment of the configuration setting.

11. The computer-implemented method of claim 10 further comprising:
   responsive to the design vector receiving a validity assessment that is negative, raising an alert to indicate that there is a potential a design configuration violation.

12. The computer-implemented method of claim 10 wherein the step of obtaining values for at least some of the attributes and parameters for the configuration setting to be validated using at least one of the one or more relationship constraints comprises:
   automatically selecting one or more of the values.

13. The computer-implemented method of claim 12 wherein the step of automatically selecting one or more of the values comprises:
   querying the functional product to obtain one or more of the values.

14. The computer-implemented method of claim 10 wherein the step of evaluating the design vector to obtain a validity assessment of the configuration setting comprises:
   evaluating one or more constraints of the design vector using one or more of the values obtained for the design vector.

15. A non-transitory computer-readable medium or media comprising one or more sequences of instructions which, when executed by at least one processor, causes steps to be performed comprising:
   generating a command template database (CT-DB) comprising one or more commands by extracting commands from technical documentation using natural language processing;
   generating, using the command template database, a command vector table (CVT) database comprising, for each command, at least some of its attributes and parameters;
   generating, using the technical documentation, a command entity-relationship dataset (CER) that associates a configuration setting with one or more relationship constraints which, when evaluated, provide a validity assessment of the configuration setting; and
   generating a design vector for the configuration setting by:
      obtaining, for the configuration setting, at least some of its attributes and parameters from command vector table database;
      obtaining, for the configuration setting, one or more relationship constraints from the command entity-relationship dataset; and
      obtaining values for at least some of the attributes and parameters for the configuration setting to be validated using at least one of the one or more relationship constraints.

16. The non-transitory computer-readable medium or media of claim 15 wherein the step of generating a command template database (CT-DB) comprising one or more commands by extracting commands from the technical documentation using natural language processing comprises:
   extracting the one or more commands from the technical documentation related to the product;
   creating a command corpus of structured commands in which each command is in a structured format; and
   inputting the structured commands into an indexer for indexing.

17. The non-transitory computer-readable medium or media of claim 15 wherein the step of generating, using the command template database, a command vector table database comprising, for each command, at least some of its attributes and parameters comprises:
   for each command, parsing its corresponding command template from the CT-DB to tabulate at least some of its attributes and parameters into a CVT record.

18. The non-transitory computer-readable medium or media of claim 17 wherein the step of generating, using the technical documentation, a command entity-relationship dataset (CER) that associates a configuration setting with one or more relationship constraints which, when evaluated, provide a validity assessment of the configuration setting comprises:
   performing a sentiment analysis on technical documentation to classify one or more sections into one or more categories that assess a validity of the configuration setting; and
   for at least one classified section of the one or more sections, forming a grouping that associates a key, a value, and a relationship constraint, in which the key represents a configuration setting keyword, the value represents a tuple that comprising a corresponding entity and its relationship to the key, and the relationship constraint represents one or more rules for use in providing a validity assessment of the configuration setting.

19. The non-transitory computer-readable medium or media of claim 18 further comprising one or more sequences of instructions which, when executed by at least one processor, causes steps to be performed comprising:
   generate a graph using groupings, wherein each key-value pair of a grouping is a node in the graph and an edge between nodes has a classification label associated with a validity assessment.

20. The non-transitory computer-readable medium or media of claim 15 further comprising one or more sequences of instructions which, when executed by at least one processor, causes steps to be performed comprising:
   evaluating the design vector to obtain a validity assessment of the configuration setting.

* * * * *